United States Patent [19]
Hanchett

[11] Patent Number: 4,991,437
[45] Date of Patent: Feb. 12, 1991

[54] AIRFOIL BALANCER

[76] Inventor: Raymond L. Hanchett, 7405 W. M78, Perry, Mich. 48872

[21] Appl. No.: 277,803

[22] Filed: Nov. 30, 1988

[51] Int. Cl.⁵ .............................................. G01M 1/02
[52] U.S. Cl. .................. 73/455; 269/254 CS
[58] Field of Search ................ 73/455, 456, 480, 481, 73/482, 487; 416/61; 269/254 CS, 902, 55

[56] References Cited

U.S. PATENT DOCUMENTS

| | | | |
|---|---|---|---|
| Re. 26,047 | 6/1966 | Freeman | 73/455 |
| 823,012 | 6/1906 | Westlake | 73/481 |
| 2,028,254 | 1/1936 | Squires | 73/456 |
| 3,826,483 | 7/1974 | Siegel | 269/254 CS |

FOREIGN PATENT DOCUMENTS 158826  1/1940  Austria .................................. 73/456

Primary Examiner—John Chapman
Attorney, Agent, or Firm—Krass & Young

[57] ABSTRACT

The invention is a method and device for precisely balancing the mass and center of gravity of airfoils, one pair at a time. Airfoils are clamped between grooved clamps having a central pin, and their tip-to-tip and root-to-root moments are balanced. Thus the mass and center of gravity are made equal. Reference positions, equally offset from the central pin, are provided to allow enhanced sensitivity when balancing airfoils of particularly small mass.

11 Claims, 2 Drawing Sheets

AIRFOIL BALANCER

FIELD OF THE INVENTION

This invention relates to balancers and methods of balancing airfoils, such as the rotor blades of a model helicopter, so the airfoils have the same mass and same position for their longitudinal center of gravity.

BACKGROUND OF THE INVENTION

Balancing of airfoils, such as the rotor blades of model helicopters, has been effected by one of two methods.

In the first method, two airfoils are mounted, in the normal fashion for ultimate use, by attaching their roots in-line on a hub from which protrude, orthogonally to the airfoils's major axis, two flybars. The flybars are placed horizontally on top of two parallel knife edges so the whole assembly is free to rotate around the flybars' axis. Mass is added to the airfoil rising above the horizontal until there is no perceived rotational movement. Careful use of this scheme results in each airfoil having very nearly the same rotational moment (the product of the distance to the center of gravity from the center of the hub times the mass times the local acceleration of gravity). A simple equation will show the significance of this scheme. Let $A_1$ and $A_2$ be the distance from the center of the hub to each center of gravity. Let $M_1$ and $M_2$ be the total mass of each airfoil, and let g be the local value of the acceleration of gravity. The moment of the first airfoil is $A_1 \times M_1 \times g$ and must be equal to the moment of the second airfoil $A_2 \times M_2 \times g$ because there is no rotation. However, this equation shows no requirement that $M_1 = M_2$ nor that $A_1 = A_2$ and thus this scheme cannot insure that the distribution of mass along each airfoil is such as to place the longitudinal center of gravity of each airfoil the same distance from the center of the hub nor can it insure that the airfoils have the same mass. If a separate adjustment is made to make $M_1 = M_2$, then the above equation shows that $A_1$ will equal $A_2$. This requires removing the airfoils from the hub, making them equal in mass, remounting them on the hub and iterating the above process. The iterations are so inconvenient to perform, and result in so much wear of the airfoils, that many do not bother to perform them.

An additional problem is that the flybars tend to deform or, to bow in use under the force of the assembly, and thus reduce the sensitivity to the detection of unequal moment.

The second method requires screwing the airfoils to a fixture, having a central pin around which balancing takes place, that functionally replaces the hub of the first method.

The new airfoil balancer overcomes the above limitations because, using only one device and without damage to the airfoils, one may conveniently and reliably adjust the mass and center of gravity of equal length airfoils to be equal. The invention accomplishes this by providing a convenient and non-destructive way to make both the root-to-root and tip-to-tip moments equal. Once again, an equation will help. Let L equal the length of each airfoil from root to tip. Let $A_1$ and $A_2$ be the root to center of gravity distances, and let $M_1$ and $M_2$ be the masses. When the root-to-root moments are equal: $A_1 \times M_1 \times g = A_2 \times M_2 \times g$. When the tip-to-tip moments are equal: $(L - A_1) \times M_1 \times g = (L - A_2) \times M_2 \times g$. Thus: $M_1 = M_2$ and $A_1 = A_2$.

The new airfoil balancer also provides increased sensitivity to differences in moment produced by low mass airfoils such as the tail rotor blades of a model helicopter. It accomplishes this by providing two reference positions an equal distance from the axis of rotation. Thus, using these offset reference positions, the moment arms are significantly longer than they would otherwise be and result in greater sensitivity.

SUMMARY OF THE INVENTION

It is the object of this invention to provide a novel and improved way to balance the mass and center of gravity placement of a large variety of airfoils using one device.

A BRIEF DESCRIPTION OF THE DRAWINGS

One will better understand the present invention by referring to the following detailed description while consulting the accompanying drawings, where the same reference numerals are used to refer to the same parts throughout the several views, and in which.

DETAILED DESCRIPTION OF THE PREFERRED EMBODIMENT OF THE PRESENT INVENTION

Figure 1:
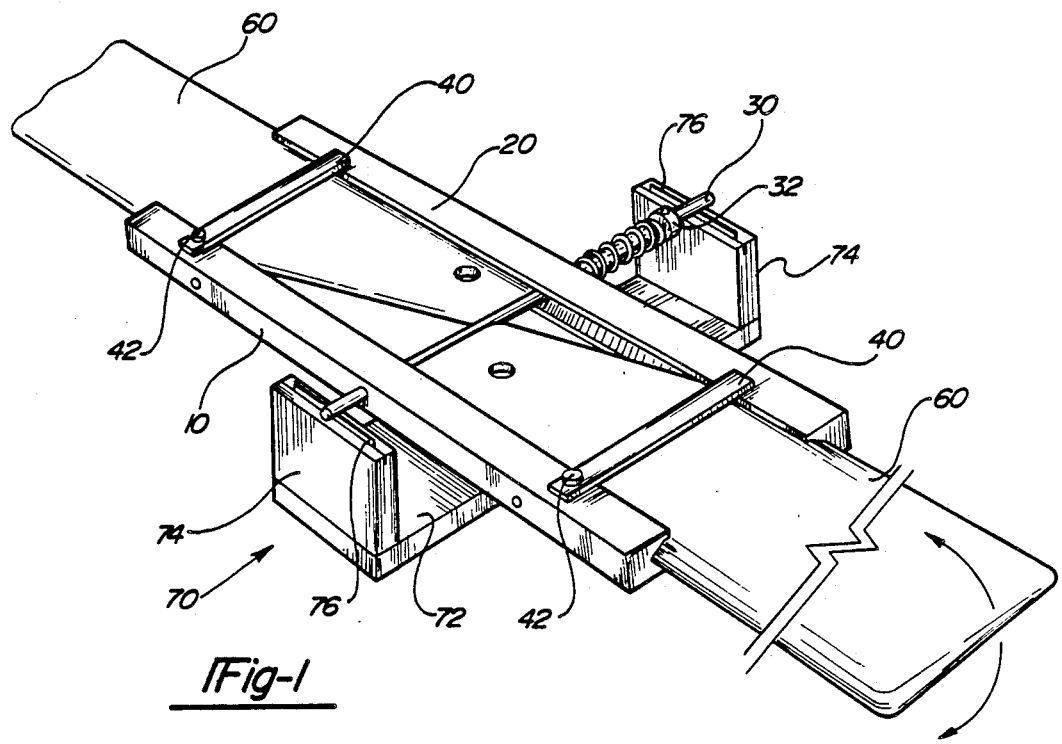
FIG. 1 is a perspective view of the airfoil balancer in use, containing two airfoils, and supported on a fixture.

FIG. 1 is a view of the balancer in operation as it would appear to a user. Two airfoils 60 are clamped between first clamp 10 and second clamp 20 with the root of each airfoil 60 snug against center pin 30. One airfoil 60 has its leading edge touching only first clamp 10 and the other airfoil 60 has its leading edge touching only second clamp 20. Cylindrical center pin 30 extends through and past first clamp 10 and second clamp 20, and rests on the parallel and horizontal razor blades 76 of fixture 70. Thus the whole assembly is free to rotate about the axis of center pin 30 and between vertical supports 74 of fixture 70. Any difference in moment between the airfoils 60 will result in rotation of the airfoils 60 with one rising above the horizontal. A small amount of mass is added near the tip of any airfoil 60 that does rise above the horizontal until there is no tendency for rotation. Thereafter the clamps are separated and the airfoils 60 removed and reinserted between the clamps with the tips touching center pin 30. As before, each airfoil 60 has its leading edge touching only one of the clamps. An airfoil 60 rising above the horizontal has enough mass added near its root to stop any tendency for rotation. Iterations may be needed to cause both the root-to-root moment and tip-to-tip moments to balance. A check of the balance of the longitudinal center of gravity is effected by placing each airfoil 60, one at a time, with its long axis parallel to and on top of clamps 10 and 20, and sliding the airfoil 60 longitudinally until balanced. The airfoil 60 is then marked, in a non-injurious way, at the location of the midpoint of the clamps. When both airfoils 60 are placed side by side, the marks, tips, and roots will be congruent. Prior to the above use, the balancer, without airfoils 60, is checked for balance and, if it is needed, is balanced by rotating the anti-torque arms 40 from the positions shown on FIG. 1.

Figure 2:
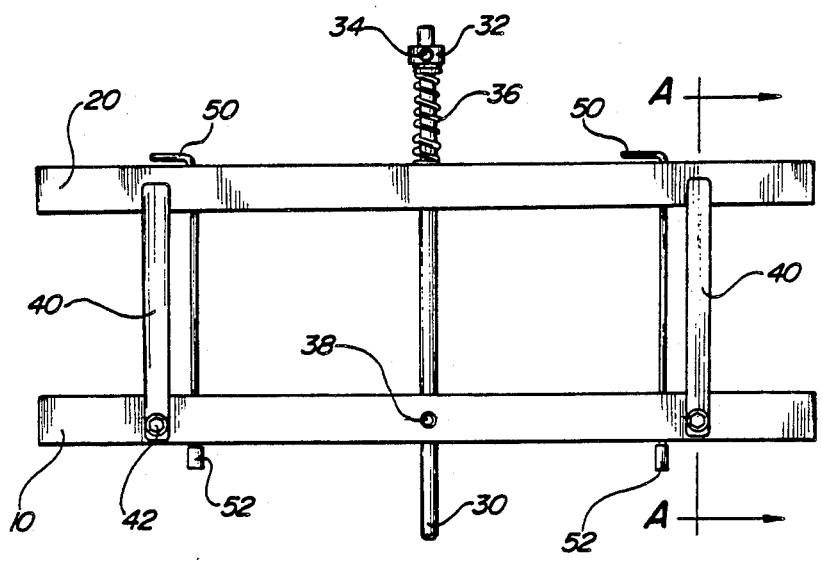
FIG. 2 is a top view of the airfoil balancer showing its parts.

The various parts of the invention are shown on FIG. 2. First clamp 10 and second clamp 20 are exactly the same with two exceptions to be described below. Each contains an orifice in its center through which center pin 30 snugly passes, two orifices near each end through which L-pins 50 may pass, and a grooved side (not shown on FIG. 2) that faces inward and within which the airfoils 60 are kept captive. First clamp 10 contains a threaded hole normal to the orifice through which center pin 30 passes for receiving set screw 38 used to keep center pin 30 captive within first clamp 10. First clamp 10 also contains two anti-torque arms 40 that are pivotally connected using an arm-screw 42 that passes through each arm 40 and a bushing 44 (not visible on FIG. 2) and then into first clamp 10. A helical tension spring 36 is placed over center pin 30 outside of second clamp 20 and retained between second clamp 20 and collar 32. Collar 32 is secured to center pin 30 by collar-screw 34 passing radially through collar 32. In operation, the pressure, clamping airfoils 60 between first clamp 10 and second clamp 20, is adjusted by loosening collar-screw 34, sliding collar 32 on center pin 30 so as to compress tension spring 36 by the proper amount, and then tightening collar-screw 34. To preserve balance, collar 32 is always rotated so that, when collar-screw 34 is tightened, collar-screw 34 is perpendicular to the plane of the two clamps. When L-pins 50 are used they are kept in place with flexible pin keepers 52 placed over their free ends.

Figure 2A:
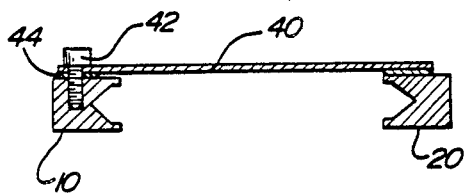
FIG. 2A is a cross section view through line A—A of FIG. 2.

The cross section view of FIG. 2A passes through both clamps 10 and 20 and the place where the anti-torque arms 40 pivot. In FIG. 2A, the grooves that help hold the airfoils 60 and the bushing 44 that facilitates the use of the anti-torque arms 40 are seen.

Figure 3:
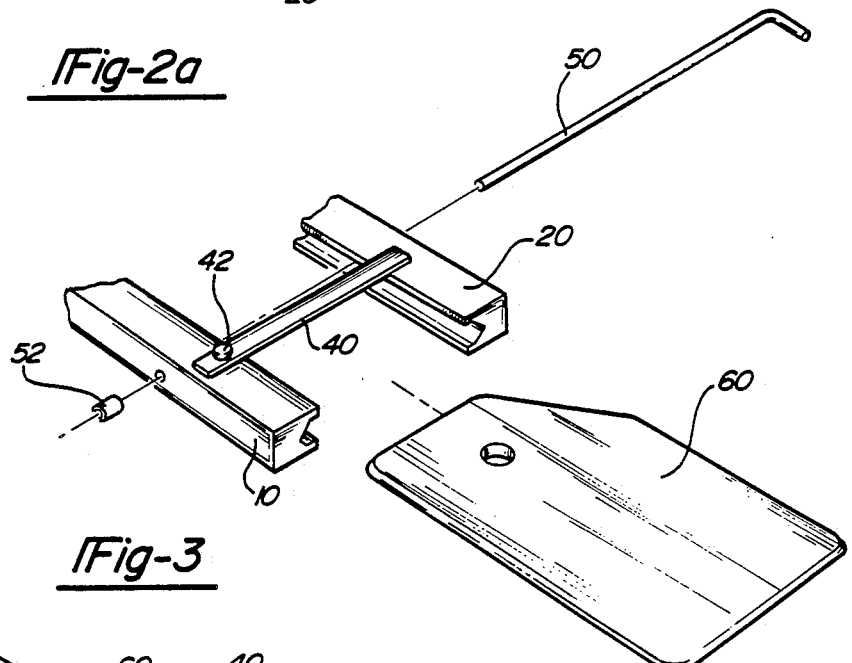
FIG. 3 is a perspective view of an end portion of the balancer showing how airfoils are inserted, and how L-pins are inserted and retained.
Figure 4:
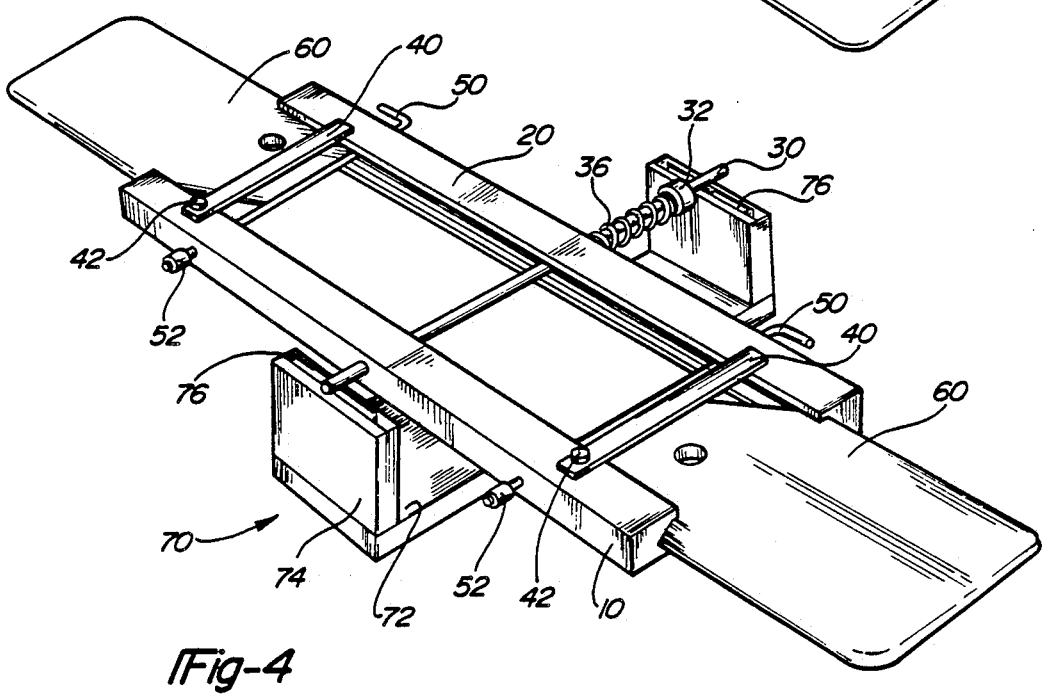
FIG. 4 is similar to FIG. 1 and is a perspective view of the airfoil balancer in use when balancing two small airfoils.

The L-pins 50 are used mainly when balancing smaller airfoils. They are used to provide two reference positions each an equal distance from the axis of center pin 30, thereby increasing the length of the moment arm, and thus increasing the sensitivity of the balance to differences in the mass or center of gravity of the smaller airfoils. FIG. 3 shows how an airfoil 60 is inserted between first clamp 10 and second clamp 20, and how an L-pin 50 is inserted normal to the clamps and retained by its shape and by pin keeper 52. FIG. 4 shows the L-pins 50 in use. The smaller airfoils 60 are clamped between first clamp 10 and second clamp 20, with the leading edge of each touching only one clamp, and with their roots touching the L-pins 50. As before, the balancer's center pin 30 is supported on the razor blades 76 of fixture 70 and small increments of mass are added near the tip of any airfoil 60 rising above the horizontal until any tendency for rotation ceases. Prior to the above use, the balancer, with L-pins 50 and their pin keepers 52, but without airfoils 60, is checked for balance and, if it is needed, is balanced by rotating the anti-torque arms 40.

The fixture 70, shown on FIG. 1, may consist of a base 72 to which are attached two vertical supports 74 spaced apart sufficiently to allow the balancer freely to rotate between them while close enough together so as to allow the center pin 30 to rest upon the sharp edges of razor blades 76 embedded in the tops of the vertical supports 74. The fixture 70 must be sturdy enough to support the balancer and the exposed edges of the razor blades 76 must be in a horizontal plane. Commercially available fixtures, such as the "High Point Balancer" may also be used.

The present invention is advantageous in a number of different respects.

First, the balancer is advantageous because, in conjunction with only a simple fixture, it is able to perform the entire task of balancing the mass and center of gravity of equal length airfoils.

The first advantage is enhanced by the balancer's second advantage of providing an easy method of mounting and demounting airfoils. In most cases, one merely spreads the clamps 10 and 20 against the force of the tension spring 36, and inserts or removes the airfoils 60. Other balancing schemes require one to attach airfoils 60 to a hub or otherwise use actual attachment with its attendant wear.

The third advantage follows from the first two. Because the airfoils 60 are clamped between the two clamps 10 and 20 with a force adjusted, by tension spring 36 and collar 32, to be just sufficient to retain the airfoils 60 within the clamps' grooves, the airfoils 60 may be expected to suffer no wear or damage from being balanced by the invention.

A further advantage of the present invention follows from its use, with smaller airfoils 60, of L-pins 50 to provide two reference positions an equal distance from the rotational axis. By lengthening the moment arm, this scheme maintains useful sensitivity when balancing smaller airfoils 60.

A still further advantage of the present invention stems from its use of a center pin 30 that is harder and stiffer than flybars. Thus there is little loss of sensitivity due to bowing in the rotational axis. Furthermore, if, after some accidental trauma to the balancer, it is suspected that the center pin 30 is no longer straight, a check may be made by loosening set screw 38 and collar-screw 34, removing the collar 32 and tension spring 36, and withdrawing the center pin 30 from the clamps 10 and 20. The withdrawn center pin 30 may be rolled on flat plane to verify its straightness.

In short, a large group of airfoils may be precisely balanced in mass and center of gravity using only one device and a simple fixture. This is accomplished with relative ease and negligible wear on the airfoils.

Although a preferred embodiment of the invention has been disclosed in detail, it will be recognized that variations or modifications lie within the scope of the present invention.

I claim:
1. A balancer of airfoils comprising:
    two clamps, each having a grooved side adapted for removably holding the edge of an airfoil and having one centrally located orifice essentially perpendicular to said grooved side;
    a straight pin slidably passing through each of said centrally located orifices, with said grooved sides facing each other, and extending beyond each of said clamps; and
    force producing means for urging said clamps together thereby securing an airfoil on each side of said pin.
2. A balancer as recited in claim 1, wherein said clamps have anti-torque arms pivotally attached essentially equidistant from said centrally located orifice.

3. A balancer as recited in claim 1, wherein said pin is cylindrical.

4. A balancer as recited in claim 1, wherein said force producing means is adjustable.

5. A balancer as recited in claim 1, wherein said force producing means is effected by a helical spring coaxial with an extension of said pin, and compressed between said clamp and a collar slidable on and attachable to said pin.

6. A balancer of airfoils comprising:
two clamps, each having a grooved side adapted for removably holding the edge of an airfoil, having one centrally located orifice essentially perpendicular to said grooved side, and having a pair of passages equally spaced from said centrally located orifice;
a straight first pin slidably passing through each of said centrally located orifices, with said grooved sides facing each other, and extending beyond each of said clamps;
two straight second pins slidably passing through said passages;
force producing means for urging said clamps together, thereby securing an airfoil outward of each second pin.

7. A balancer as recited in claim 6, wherein said clamps have anti-torque arms pivotally attached essentially equidistant from said centrally located orifice.

8. A balancer as recited in claim 6, wherein said first pin is cylindrical.

9. A balancer as recited in claim 6, wherein said force producing means is adjustable.

10. A balancer as recited in claim 6, wherein said force producing means is effected by a helical spring coaxial with an extension of said first pin, and compressed between said clamp and a collar slidable on and attachable to said first pin.

11. A balancer of airfoils comprising:
two clamps, each having a grooved side adapted for removably holding the edge of an airfoil, having one centrally located orifice essentially perpendicular to said grooved side, and having a pair of passages equally spaced from said centrally located orifice and essentially perpendicular to said grooved side;
anti-torque arms pivotally attached to one of said two clamps essentially equidistant from said centrally located orifice;
a cylindrical straight first pin slidably passing through each of said centrally located orifices, with said grooved sides facing each other, and extending beyond each of said clamps;
two straight second pins slidably passing through said pair of passages;
force producing means for urging said clamps together, thereby securing an airfoil outward of each second pin, wherein said force producing means comprises a helical spring coaxial with an extension of said first pin, and compressed between one of said clamps and a collar slidable on and attached to said first pin.

* * * * *